June 9, 1953 — G. A. F. WINCKLER ET AL — 2,641,624

CELL

Original Filed June 16, 1949 — 2 Sheets-Sheet 1

INVENTORS
Gunnar A. F. Winckler
Otto K. Reinhardt
BY
Pennie, Edmonds, Morton and Barrows
ATTORNEYS June 9, 1953  G. A. F. WINCKLER ET AL  2,641,624
CELL
Original Filed June 16, 1949  2 Sheets-Sheet 2

INVENTORS
Gunnar A. F. Winckler
Otto K. Reinhardt
BY
ATTORNEYS

Patented June 9, 1953

2,641,624

UNITED STATES PATENT OFFICE 2,641,624

CELL

Gunnar A. F. Winckler, Milford, and Otto K. Reinhardt, West Haven, Conn., assignors to Olin Industries, Inc.

Original application June 16, 1949, Serial No. 99,448. Divided and this application June 16, 1950, Serial No. 168,478

2 Claims. (Cl. 136—125)

This invention relates to improvements in primary cells and generally to improvements in primary cells using an air-depolarized cathode with a suitable electrolyte and a metal anode. More particularly, this invention relates to improvements in cells functioning by the zinc-alkali-carbon-oxygen electro-chemical system.

While cells of this type are well known and are particularly suitable for some uses, their use has, in the past, been limited. In the present invention we provide a cell of this type that is very simple and inexpensive to manufacture and that possesses certain advantages over known constructions heretofore proposed, or used.

In carrying out the invention, we provide a cathode in the form of a molded cup of carbonaceous material, thus eliminating the necessity of an outer casing. The cup is formed of a molded mixture of activated carbon and a plastic binder producing an electrode that is permeable to air to permit oxygen to reach the interface between the electrode and the electrolyte and is impermeable to aqueous solutions, constituting the electrolyte. The inner surface of the cathode may be partly coated with air-impermeable material to control the electrical characteristics of the cell. Thus, for low drain applications, such control of the air supply increases the active life of the cell.

The anode preferably comprises a strip of zinc or other metal bent into U-shape and secured by molding in a cap which supports the anode within the carbon cup and forms a closure for the cell. Such construction provides increased metal surface exposed to the electrolyte, thereby providing high flash current and better characteristics on high drain. The use of such an anode in combination with a cathode in which the bottom of the cathode cup is active tends to emphasize consumption of the bottom of the zinc electrode thereby decreasing the possibility that the anode will preferentially corrode at the electrolyte line and eventually drop off large portions of unconsumed metal into the bottom of the cell.

The simplified construction in which the anode is molded into the plastic cap permits positive and easy positioning of the metal electrode within the carbon cup, eliminates complicated connections and also eliminates the use of a bottom washer or the like to prevent internal shorting of the cell. The cap forms a pressure fit with the top of the carbon cup and by use of a suitable sealing composition materially decreases the possibility of leakage. Suitable terminals may be molded on the bottom of the carbon cup.

This application is a division of our copending application Serial No. 99,448, filed June 16, 1949, the claims of that application being directed to the cathode of the cell, and the claims of this application being directed to the anode.

In the accompanying drawings we have shown two embodiments of the invention. In this showing:

Figure 1:
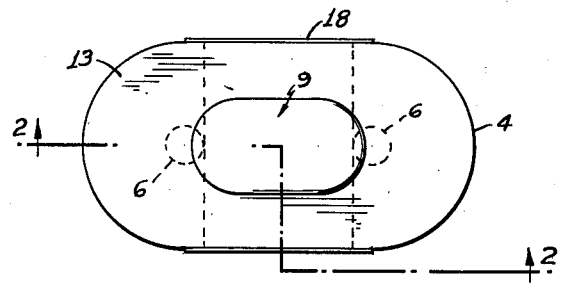
Fig. 1 is a plan view.

Referring to the drawings the reference numeral 1 designates generally the carbon cup. The cup is formed of a suitable moldable mixture of activated carbon and a plastic binder which will produce an electrode having the desired characteristics. It must be permeable to air to permit the oxygen from the air to reach the interface between the carbon electrode and the contained electrolyte. It must also be impermeable to the electrolyte solution as otherwise the pores or spaces in the carbon become filled with electrolyte and thus block off the admission of air.

In forming the carbon cup we employ a mixture of activated carbon and a suitable binder, such as ethyl cellulose. Polystyrene, polyvinyl chloride, or other plastic material, which is resistant to decomposition by the electrolyte and which is also not wetted by the electrolyte, may be used in place of ethyl cellulose. The amount of binder employed may be varied and, in general, the percentage of the binder controls the permeability of the carbon to air. The greater the proportion of binder, the less permeable is the resulting molded cup. In actual practice we have found that a proportion of 15 percent by weight of ethyl cellulose to activated carbon gives a satisfactory cup. Ethyl acetate may be employed as a solvent for the binder and a trace of lubricating oil added to the molding mixture. The cup is molded cold and air dried. However, suitable cups may also be made by a hot low pressure molding process, in the absence of a volatile solvent.

The cell, of course, may be of any desired size and shape and as illustrated, it is oval in horizontal cross section consisting of front and back walls 2 and 3 and rounded ends 4. The walls are joined by a bottom 5 on which buttons 6, serving as terminals, may be molded. At its upper edge the thickness of the wall of the cup may be decreased as indicated at 7 and the face or outer surface 8 of this upper portion may be tapered to facilitate assembly of the positive cap.

Figure 2:
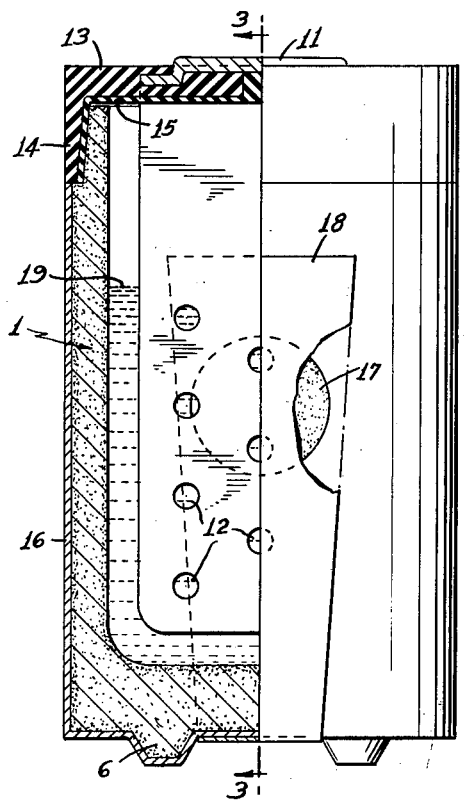
Fig. 2 is a vertical, sectional view on line 2—2 of Fig. 1.

The zinc electrode 9, to which this application is directed, is formed of a single sheet or strip of zinc which is bent into U-shape forming a pair of legs 10. At the bottom of the U, the strip is headed, as shown at 11 in Fig. 2 of the drawings, to provide an anchorage flange and a terminal portion. The strip is adapted to be assembled with a plastic cap with the terminal portion of the zinc electrode exposed at the top of the cell to function as a terminal thereof and with the anchorage flange embedded wholly in the plastic cap. As shown, the legs 10 are parallel as shown, or bent toward each other to insure further against contact with the cup 1, and provided with a plurality of spaced openings 12. The provision of these openings results in more even consumption of the zinc when the cell is in use.

The prepared zinc electrode is insert molded into a plastic cap 13, the cap having a depending flange or skirt 14 to snugly receive the outer surface 8 of the top of the carbon cup. The cap forms a pressure fit over the carbon cup and the engaging surfaces are provided with a seal 15 of a rubber cement, polyvinyl chloride solution, or the like.

The construction heretofore described produces a complete and operative cell. However, air depolarized cells having an alkaline electrolyte, once exposed to air, become inoperative within a certain period of time whether or not the cell is in use throughout the entire period. It is therefore desirable, in some instances, to control the permeability of the carbon electrode to air to increase the effective life of the cell. This is particularly true when the cell is used for low drain application. In such instances, a portion of the interior surface of the carbon electrode may be coated with a plastic binder impermeable to air to decrease the area of the interface between the electrolyte and the cathode.

In the drawings, we have illustrated a plating 16 formed by electroplating the exterior surface of a portion of the carbon cup with metal. As shown, openings or windows 17 are provided in the plating on opposite sides of the cell to permit access of air. Instead of electroplating, the metal coating may be sprayed, or a thin metal shell may be employed in which the carbon electrode is snugly received. Preferably, the contact between the metal coating and the cup is an intimate one, such as is obtained when the coating is electroplated, in order to obtain optimum electrical contact.

As a further expedient for controlling the life of the cell, a strip 18 of tape having an adhesive coating may be applied to the exterior of the carbon cup to normally cover the openings or windows 17 in the casing. This strip may be retained on the cell until it is actually ready for use and if the cell is to be used intermittently, it may be removed sufficiently to uncover one or both of the windows 17 while the cell is in active use and replaced during intervals when the cell is not in active use.

Figure 3:
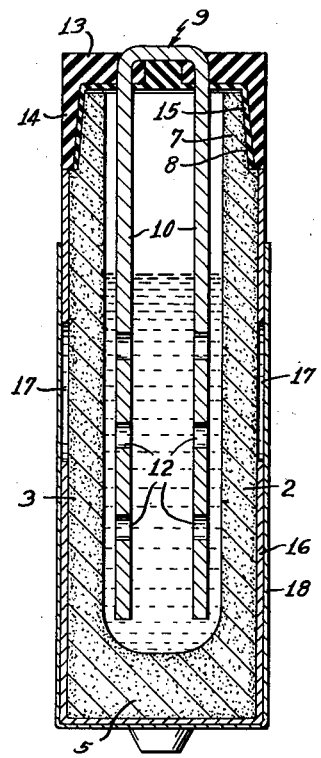
Fig. 3 is a similar view on line 3—3 of Fig. 2.
Figure 4:
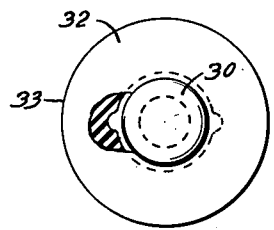
Fig. 4 is a plan view, parts shown in section, of another form of the invention.
Figure 7:
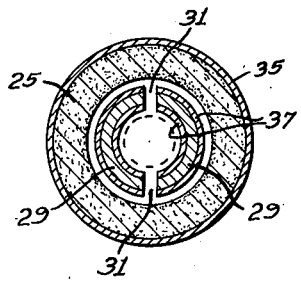
Fig. 7 is a horizontal, sectional view on line 7—7 of Fig. 6.
Figure 5:
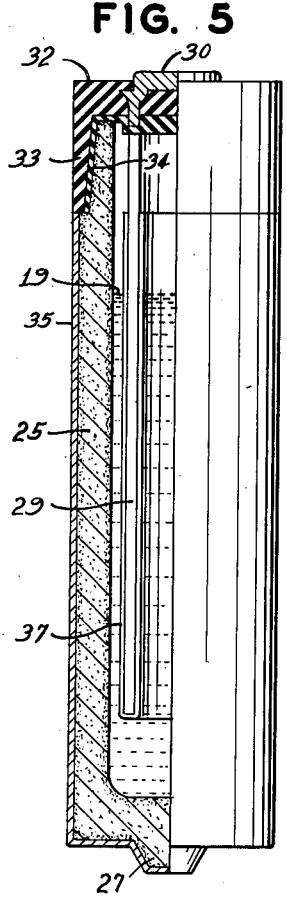
Fig. 5 is an end elevation, parts shown in section, of the cell shown in Fig. 4.
Figure 6:
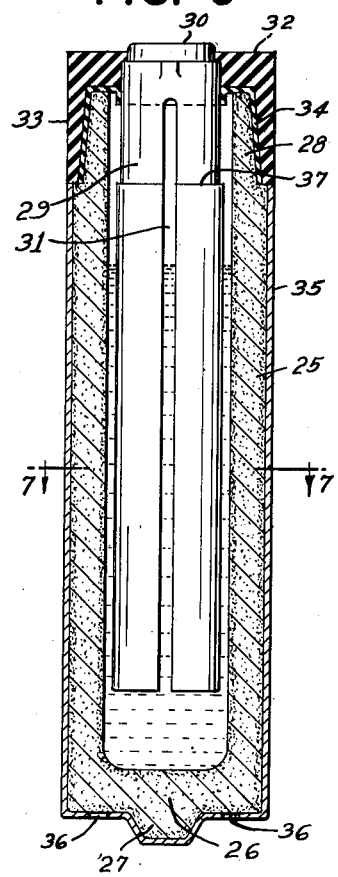
Fig. 6 is a vertical, sectional view.

Referring to Figs. 4 to 7 of the drawings, the reference numeral 25 designates a carbon cup which may be prepared as heretofore described but which, as shown in Figs. 4 to 7, is circular in cross section and represents a cell of the size known as the AA size. This cup may be molded of activated carbon and a suitable binder in the manner heretofore described and is provided with a bottom 26 having a button 27 formed therein to serve as a lower terminal. The upper end 28 of the wall of the cup is decreased in thickness as heretofore described for the reception of the cap or closure. An anode 29 formed of zinc or other metal is arranged in the cup. As in the form of the invention heretofore described, the anode is formed of a single sheet or strip of metal which is bent into a U-shaped member forming the two legs and is headed, as indicated at 30, at the bottom of the U, to permit it to be assembled with a plastic cup. The legs, as shown in Fig. 7, are also shaped in arcs in horizontal cross section so that the anode is substantially equally spaced from the inner wall of the carbon cup throughout the entire cell. Spaces 31 are formed between the adjacent edges of the two legs of the anode and the legs may be provided with spaced openings (not shown) similar to the openings 12 in the form of the invention shown in Figs. 1 to 3 of the drawings.

The anode is insert molded into a plastic cup 32 in the manner heretofore described, this cup having a depending skirt 33 to snugly receive the outer surface of the top 28 of the carbon cup. The cup forms a pressure fit and the engaging surfaces are provided with a seal 34 of rubber cement, polyvinyl chloride solution, or the like.

To control the permeability of the carbon electrode to air to increase the effective life of the cell, portions of the interior surface of the carbon electrode may be coated with a plastic binder impermeable to air to decrease the area of the interface between the electrolyte and the cathode. As heretofore described, the outer surface of the cathode may be provided with a metal jacket 35 formed in any of the ways heretofore described. This metal jacket may have one or more openings 36 to permit access of air. These openings may be placed at any desired point and are illustrated in the bottom of the jacket in this form of the invention (see Fig. 6). If the electrode is provided with the openings 12, the paper liner is, of course, provided with registering openings.

Any of the usual alkaline electrolytes may be employed. In actual use we have employed a 25 percent sodium hydroxide solution. The electrolyte is placed in the cup as indicated at 19. If desired, the electrolyte may be immobilized by known means, for example, by the addition of a suitable absorbent or by the addition of a suitable starch or gum. When a starch or gum is used to immobilize the electrolyte, it is advantageous to cover the metal electrode with a sheet paper liner, since shrinkage of the gelled electrolyte is then offset by swelling of the paper. Such a liner is shown at 37 in Figs. 5 to 7 of the drawings.

It may at times be advantageous to use electrolytes other than an alkali solution. For example, salt solutions, such as ammonium chloride, with or without other chlorides such as of zinc, or a solution of an alkali or alkaline-earth halide, may be used. When the anode metal consists of magnesium, the electrolyte preferably consists of a solution of magnesium bromide, or the bromide of some other alkali or alkaline-earth metal, containing a small amount of an alkali chromate as inhibitor.

It is to be understood that the above-described cathode construction may be applied to other electrode elements capable of depolarization by gaseous oxygen. For example, the activated carbon may have admixed therewith significant amounts of metallic oxides or salts, such as oxides of manganese or permanganates.

The simplicity of the cell will be apparent from the foregoing description. The carbon cups are molded as heretofore described and, if desired, plated to form the shell 16 or placed or molded in a preformed metal can. The electrolyte is then placed in the cup to the proper level and the upper edge 8 of the cup wiped with a rubber cement or polyvinyl chloride solution, or the like after the interior of the plastic top has been coated with the same in order to prevent creepage of the electrolyte. The preformed anode and plastic cap is then assembled with the cup, the anode being placed in the cup as shown, and the cap forming a pressure fit over the top of the cup. If the strip 18 is employed, it is then placed on the completed cell.

The coating applied to portions of the interior surface of the cathode cup, for controlling the permeability of the cathode to air, may be asphalt, shellac, varnish, other resinous coatings, or other similar material.

In either form of the invention the anode may be amalgamated in known manner before assembly with the cap.

We claim:

1. A cell element comprising a U-shaped strip of metal the two legs of which form the anode of a cell, the metal strip being capped throughout a portion of its width at the loop of the U, and a cap of molded plastic material, the strip of metal being molded into the cap at the loop of the U, and having a portion extending beyond the cap to form a terminal, the cap having a depending flange to engage the top of a cell casing and form a closure for the cell.

2. A cell element comprising a U-shaped strip of metal, the two legs of which are adapted to form the anode of a cell, the metal strip being headed at the loop to provide an anchorage flange and a terminal portion, and a cap of molded plastic material, the strip of metal being molded into the cap at the loop of the U with the anchorage flange embedded wholly within the cap and the terminal portion exposed at the outer side of the cap, the plastic cap being adapted to form the closure of a cell.

GUNNAR A. F. WINCKLER.
OTTO K. REINHARDT.

References Cited in the file of this patent

UNITED STATES PATENTS

| Number | Name | Date |
|---|---|---|
| 1,196,611 | Tassin | Aug. 29, 1916 |
| 1,286,750 | Palmer | Dec. 3, 1918 |
| 1,481,145 | Pepper | Jan. 15, 1924 |
| 1,631,568 | Yngve | June 7, 1927 |
| 2,424,149 | Chaplin | July 15, 1947 |

FOREIGN PATENTS

| Number | Country | Date |
|---|---|---|
| 9948/32 | Australia | Nov. 2, 1933 |
| 88,949 | Switzerland | Aug. 1, 1921 |